(12) United States Patent
Pasirstein et al.

(10) Patent No.: US 11,816,942 B2
(45) Date of Patent: Nov. 14, 2023

(54) DETECTING INTENT OF A USER REQUESTING ACCESS TO A SECURED ASSET

(71) Applicant: TruU, Inc., Palo Alto, CA (US)

(72) Inventors: David Brett Pasirstein, Denver, CO (US); Jonathan Welch, Longmont, CO (US); Andrew Weber Spott, Boulder, CO (US); Lucas Allen Budman, Denver, CO (US); Amitabh Agrawal, Superior, CO (US); Niles William Hacking, Golden, CO (US)

(73) Assignee: TruU, Inc., Palo Alto, CA (US)

( * ) Notice: Subject to any disclaimer, the term of this patent is extended or adjusted under 35 U.S.C. 154(b) by 396 days.

(21) Appl. No.: 17/179,316

(22) Filed: Feb. 18, 2021

(65) Prior Publication Data

US 2021/0256789 A1   Aug. 19, 2021

Related U.S. Application Data

(60) Provisional application No. 62/978,300, filed on Feb. 19, 2020.

(51) Int. Cl.
*G07C 9/20* (2020.01)
*H04L 67/12* (2022.01)

(52) U.S. Cl.
CPC ............... *G07C 9/20* (2020.01); *H04L 67/12* (2013.01)

(58) Field of Classification Search
CPC ........ G07C 9/20; G07C 9/28; G07C 2209/63; H04L 67/12; G06F 21/554
See application file for complete search history.

(56) References Cited

U.S. PATENT DOCUMENTS

| | | | | |
|---|---|---|---|---|
| 2011/0289025 A1* | 11/2011 | Yan | ......................... | G06N 5/025 706/47 |
| 2017/0337261 A1* | 11/2017 | Wang | .................. | G06F 16/3329 |
| 2019/0244126 A1* | 8/2019 | Samadani | .......... | A61B 5/02416 |

* cited by examiner

*Primary Examiner* — Mohammed Waliullah
(74) *Attorney, Agent, or Firm* — Fenwick & West LLP

(57) ABSTRACT

An intention detection mechanism detects a target user accessing an operational context and accesses sensor data collected by a plurality of sensors encoding signals describing one or more characteristics of the target user and surroundings of the target user. The intention detection mechanism converts the accessed sensor data into a multi-channel sensor data time series, where each channel represents a characteristic of the target user. The intention detection mechanism compares the sensor data time series to a multi-channel intentionality template to determine whether the sensor data time series contains the multi-channel intentionality template. The multi-channel intentionality template describes characteristics indicative of an intent of a target user accessing the operational context. If the sensor data time series contains the multi-channel intentionality template, the intention detection mechanism communicates a signal confirming that the target user intended to access to the operational context.

20 Claims, 6 Drawing Sheets

DETECTING INTENT OF A USER REQUESTING ACCESS TO A SECURED ASSET

CROSS REFERENCE TO RELATED APPLICATION

This application claims the benefit of U.S. Provisional Application No. 62/978,300, filed on Feb. 19, 2020, which is incorporated by reference in its entirety.

TECHNICAL FIELD

This disclosure relates generally to techniques for granting a user access to a secured asset, and more specifically to techniques for anticipating intent of a user to access the secured asset.

BACKGROUND

In the physical world, knocking on a door is commonly used to indicate an intent to open a door or to gain access to an area. In the digital world, however, enabling a user to provide a similar input gesture to a technological device is a challenging problem. Devices, for example mobile phones, contain sensors such as accelerometers, gyroscopes, magnetometers, and microphones that may be used to detect varying measurements representing a knock, either alone or in combination. While such devices may be effective in a controlled environment, when practically implemented in an uncontrolled environment, conventional intention-detecting devices are prone to a significant number of false positives. For example, a user jumping or running with the device or dropping the device on a hard surface could be misinterpreted as a knock requesting access to an operational context. Additionally, conventional intention-detecting mechanisms may unreliably detect gestures while a target user is walking or using a device on non-flat or non-hard surfaces. The combination of false positives with the unreliability of existing systems is further compounded by a risk that multiple gestures with different intentions could be defined by a common pattern for requesting access.

Further compounding the struggles of conventional systems, conventional intention-detecting devices are energy sensitive. For example, it may be problematic to add complex processing capabilities to enable mobile phones to filter and improve the gesture performance due to resource constraints. A device that is continuously processing to determine if sensor data indicates a request for access consumes energy, processing and communication system resources at an aggressive rate in devices that have such limited capabilities.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

Figure 1:
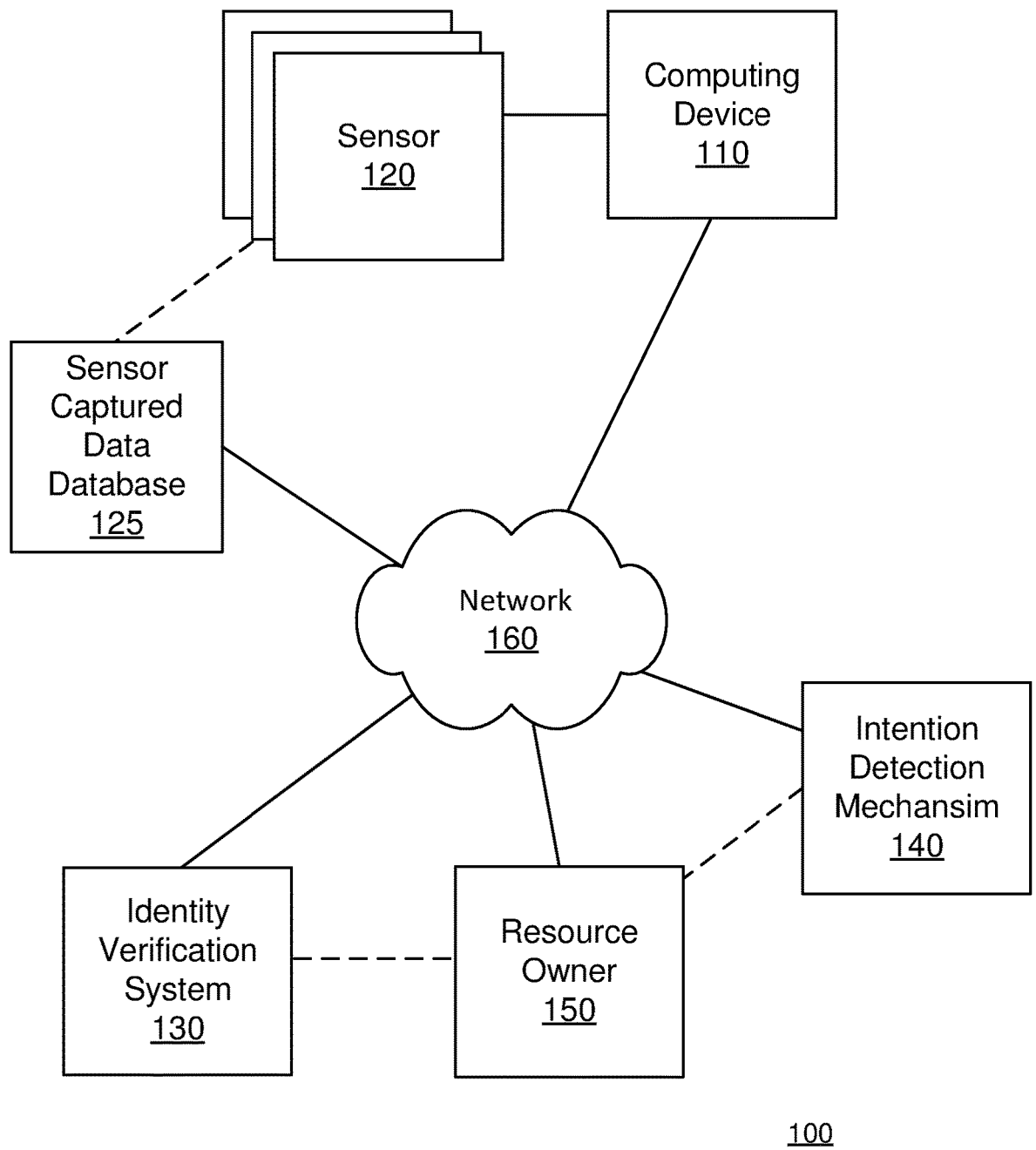
FIG. 1 illustrates an example of a user identification system for identifying a target user based on sensor captured data which includes motion data characterizing the target user, according to one embodiment.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Overview

When a target user requests access to an asset located within a secure operational context, a user identification system makes a decision to grant the target user access to the operational context. The user identification system considers whether the target user's authentication credentials qualify them to access the operational context and whether the target user intended to access the operational context at that time when they requested access. Embodiments of a user identification system determine the identity of a user based on characteristic data received from a plurality of sources, for example using data collected by an accelerometer or gyroscope on a user's mobile device. The data may be collected using one or more of the following: cameras, motion sensors, global positioning system (GPS), WiFi (SSID/BSSID, signal strength, location, if provided), and multitude of other sensors capable of recording characteristic data for a user.

As described herein, an operational context may refer to asset-specific circumstances. Asset-specific circumstances describe the actual asset that a target user is requesting access to and the environment in which the asset is secured. In an implementation where an operational context is characterized based on an asset itself, the operational security module 520 may assign a greater risk operational context to a bank vault containing priceless pieces of art compared to an empty bank vault. Examples of an environment or asset that a target user is requesting access include, but are not limited to, a secured physical environment, a secured digital server, or a secured object or person. For example, the operational security module 520 may assign a bank vault a greater risk operational context than a safe in a hotel room. As an additional example, the operational context for an asset at a site located in Russia may be characterized differently than the access to the same asset at a site located in the United States.

Additionally, an operational context may vary based on the types of actions required for a user to enter a site. For example, the operational context for a site which can be entered by opening a single door may be assigned a higher level of risk than a site which can be entered by navigating through several hallways and by opening several doors.

Although techniques and embodiments described herein, may be described with reference to motion data, a person having ordinary skill in the art would recognize that those techniques and embodiments may be applied to motion data, non-motion data, or a combination therefore more generally referred to as "characteristic data".

As described herein, characteristic data collected for a user refers to both motion data and/or non-motion data. In addition to visual characteristics, individuals may be characterized with particular movements and motion habits. Accordingly, motion data, as described herein, describes not only a particular movement by a user, but also additional considerations, for example the speed at which the motion occurred, or the various habits or tendencies associated with the motion. By identifying one or a combination of particular movements based on data captured by motion sensors the system may be able to identify a user from a population of users. In embodiments in which the system uses a combination of movements to identify a user, the user identification system operates under the assumption that each user is associated with a unique combination of motion data. Accordingly, a unique combination of motion data may be interpreted as a user's unique signature or identifier. For example, although two users may swing their arms while walking and holding their phone, each user swings their arms at a different rate or cadence. To generate the unique combination of interest, the user identification system may consider signals recorded from several sensors and/or a combination of several such signals. In some embodiments, the unique combination of motion data (or signature for a user) may be interpreted at a finer level of granularity than the above example.

As a target user moves with their mobile device, motion sensors within the mobile device or communicatively coupled to the mobile device (e.g., smartwatch or bracelet or pendant with sensors communicatively coupled to a smartphone) record motion data. The user identification system applies a machine learned model or a combination of machine-learned models to analyze the recorded motion. Accordingly, the user identification system, as described herein may verify a true (or actual) identity of a target user (or individual) in addition to confirming that the target user has certain access credentials. When a mobile device is in motion, sensor data describing the motion of the mobile device is communicated to a server where human identification inference is performed.

In addition to motion data, the user verification system may also consider non-motion data; that is data which provides insight into the identity of a user independent of the movement or motions of the user. Non-motion data includes, but is not limited to biometric data (e.g., facial recognition information or a fingerprint scan), voice signatures, keyboard typing cadence, or data derived from other sources that do not monitor movement (e.g., Wi-Fi signals or Bluetooth signals).

In some embodiments, characteristic data may also describe a target user's intent to perform certain actions within an operational context, for example their intent to access an operational context or request access to an operational context. A target user's intent to access an operational context containing a physical or an electronic asset may be determined based on characteristic data collected by a combination of sensors configured to record information about the device's physical parameters, the target user's environment, and the target user's physical condition. For example, characteristic data collected for a target user indicate that they are walking towards an operational context, describe the speed at which they are walking (or any other relevant characteristics of their walk), and detect that they knocked on a door securing the operational context. The characteristic data describing the walk characterizes the target user's movement within the operational context, but the characteristic data describing the knock at the door describes the target user's intent to access or request access to the secured operational context.

As described herein, the mechanism used to collect and evaluate intent indication data is referred to as an "intention detection mechanism." An intention detection mechanism, as described herein, implements various sensors to determine when to evaluate collected motion data, when to filter motion data using energy non-intensive operations, when to refine signals in the collected motion data, when to analyze and interpret signals in the collected motion data as intent indication data, and when to notify or trigger access to an operational context in the event of successful authentication. Accordingly, in one embodiment, the intention detection mechanism contains software for processing the raw sensor data using a matched filter bank. As an example, the intention detection mechanism may determine whether a target user has knocked on an intention detection mechanism a specified number of times. If the intention detection mechanism recognizes a valid knock pattern by comparing the knock pattern to a knock template, the mechanism may generate a request for the user identification system to grant the target user access. The intention detection mechanism may process motion data while remaining agnostic to surface type, shape, position, or surrounding of a computing device.

In addition to the embodiments described herein, the intention detection mechanism may be implemented in systems or enterprises that do not perform identity verification techniques. For example, a haunted house may grant a visitor access to certain rooms based on the visitor's intent to access a room, regardless of their identity.

System Environment Example

FIG. (FIG. 1 shows a user identification system 100 for identifying a target user based on sensor captured data which includes motion data characterizing the target user, according to one embodiment. The user identification system 100 includes at least one computing device 110, one or more sensors 120, an identity verification system 130, a resource owner 150, and a network 160. Although FIG. 1 illustrates only a single instance of several components of the user identification system 100, in practice, the user identification system 100 may include more than one of each component.

A user may interact with a computing device 110 to collect motion data. The computing device 110, or other computer system (not shown), interacts with and communicates with the identity verification system 130 via the network 160. The computing device 110 may be a computer system, for example, having some or all of the components of the computer system described with FIG. 6. For example, the computing device may be a desktop computer, a laptop computer, a table computer, a mobile device, a smartwatch, or a pendant. The computing device 110 is configured to communicate with a sensor 120. A sensor 120 may be integrated into the computing device 110, for example a computing device with one or more sensors within. The communication also may be wireless, for example, via a short-range communication protocol such as BLUETOOTH with a device having one or more sensors (e.g., a smartwatch, pedometer, bracelet with sensor(s)). In addition, the computing device 110 may work in conjunction with other computing devices. For example, a smartphone and a smartwatch may work in conjunction to collect motion data for a single target user.

With access to the network 160, the computing device 110 transmits motion data recorded by the sensor 120 to the identity verification system 130 for analysis and user identification. For the sake of discussion, the computing device 110 is described as a device with a smaller form factor (e.g., portable) mobile device (e.g., a cellular phone or smartphone), but a person having ordinary skill in the art would appreciate that the computing device could be any device configured to collect motion data, for example laptop computers, portable computers, personal digital assistants, tablet computer, or any other device including computing functionality and data communication capabilities to execute one or more of the processing configurations described herein. Such devices often have form factors and size that limit energy, processing and communication resources due to properties of physics and chemistry. An example of one or more components within a computing device 110 is further described with reference to FIG. 6.

The one or more sensors 120 may be configured to collect motion data (direct and indirect) describing the movements of a target user operating the computing device 110. As described herein, sensors 120 may refer to range of sensors or data sources that are configured to, collect direct motion data (e.g., accelerometers, gyroscopes, global positioning sensor coordinates, etc.), indirect motion data (e.g., Wi-Fi data, compass data, magnetometer data, pressure information/barometer readings), or any other data recorded by a data source on or in proximity to the computing device 110. In some embodiments, the computing device 110 may include peripherals, for example, a computer mouse, a trackpad, a keyboard, and a camera.

The identity verification system 130 may be configured as a verification system to analyze motion data to draw inferences about an identity of a target user. For example, the identity verification system 130 may receive motion data and performs a series of analyses to generate an inference about an identify of a target user for whom the motion data was recorded. Generally, the identity verification system 130 may be designed to handle a wide variety of data. The identity verification system 130 may include logical routines that perform a variety of functions including checking the validity of the incoming data, parsing and formatting the data if necessary, passing the processed data over the network 160 to a database server for storage, confirming that the database server has been updated, and identifying a target user. The identity verification system 130 communicates, via the network 160, the results of an identification and the actions associated with it to the computing device 110 for presentation to the target user via a visual interface.

More information regarding the identity verification system 130 can be found in U.S. patent application Ser. No. 17/173,184 filed on Feb. 10, 2021, which is incorporated by reference herein in its entirety.

The intention detection mechanism 140 may be a computing device consistent with the description of the computing device 110 above. In one example, the intention detection mechanism 140 may be a digital touchpad on a door that collects motion data in the form of a knock on the door, a numeric passcode entered on the touchpad, or another form of motion data suggesting that the target user is moving towards the door or attempting to open the door. In some implementations, multiple intention detection mechanisms 140 may be implemented in combination to performance a more holistic evaluation of a target user's intent. In another example, the intention detection mechanism 140 is a device worn or carried by a target user that collects motion data from the target user in real-time. The intention detection mechanism 140 detects when the target user intentionally requests access to an operational context using a combination of sensors including, but not limited to, accelerometers, gyroscopes, microphones, and pressure sensors.

The intention detection mechanism 140 filters false positive detections with an efficient energy allocation to achieve a high detection fidelity (e.g., reduced likelihood of false positives). For example, when a majority of matched filter channels detect pulse shapes that are characteristic of a knocking pattern, the intention detection mechanism 140 communicates a signal to the identity verification system 130 indicating that the target user has intentionally knocked on the device. As will be further described below, the intention detection mechanism 140 may apply s filtering threshold to improve energy efficiency and to further eliminate signal noise. Functionality and data processing techniques described with reference to the intention detection mechanism 140 may be performed directly by the computing device 110, the identity verification system 130, or both.

The resource owner 150 is a system, for example a security system, that is installed at an enterprise or remotely operated for an enterprise. When the intention detection mechanism 140 confirms a target user's intent to request access to an operational context and the identity verification system 130 authenticates the credentials of the target user, the resource owner 150 provides the target user with access to the operational context.

The network 160 represents the various wired and wireless communication pathways between the computing device 110, the identity verification system 130, and the sensor captured data database 125, which may be connected with the computing device 110 or the identity verification system 130 via network 160. Network 160 uses standard Internet communications technologies and/or protocols. Thus, the network 160 can include links using technologies such as Ethernet, IEEE 802.11, integrated services digital network (ISDN), asynchronous transfer mode (ATM), etc. Similarly, the networking protocols used on the network 160 can include the transmission control protocol/Internet protocol (TCP/IP), the hypertext transport protocol (HTTP), the simple mail transfer protocol (SMTP), the file transfer protocol (FTP), etc. The data exchanged over the network 160 can be represented using technologies and/or formats including the hypertext markup language (HTML), the extensible markup language (XML), a custom binary encoding etc. In addition, all or some links can be encrypted using conventional encryption technologies such as the secure sockets layer (SSL), Secure HTTP (HTTPS) and/or virtual private networks (VPNs). In another embodiment, the entities can use custom and/or dedicated data communications technologies instead of, or in addition to, the ones described above. In alternate embodiments, components of the identity verification system and the sensor captured data database 125 may be stored on the computing device 110.

Intention Detection Mechanism Example

When determining whether to grant a target user access to an operational context (e.g., a building, location, site, or area outfitted with an authentication security system), an intention detection mechanism, for example intention detection mechanism 140, assesses whether the target user intended to request access to the operational context. Regardless of whether the target user has sufficient authentication credentials to gain access, if the target user did not intend to request that access, the identity verification system 130 may be configured to not attempt to grant them access. In comparison, if the target user did intend to request access, the identity verification system 130 may be configured to grant them access if they have sufficient authentication credentials.

A user identification system 100 can preserve computational resources and improve processing efficiency by verifying the intent of the target user before generating a request or instructions to authenticate the target user. In such example embodiments, the intention detection mechanism 140 determines whether a target user intended to access an operational context. If the intention detection mechanism confirms that the target user did intend to access the operational context, the identity verification system 130 confirms the authentication credentials offered by the target user based on characteristic data collected for the target user. If the intention detection mechanism confirms that the target user did not intend to access the operational context, the identity verification system 130 may preserve computational resources by deciding not to authenticate the target user in favor of denying the target user access to the operational context without considering their authentication credentials. When the intention detection mechanism 140 confirms a target user's intent to request access to an operational context, the intention detection mechanism 140 may transmit this confirmation to the identity verification system 130 indirectly via the network 160 or directly via BLUETOOTH, Wi-Fi, or any other means to the resource owner 150.

When requesting access to an operational context, a target user presents authentication information (i.e., motion data, login information, or biometric data) to the identity verification system 130. The identity verification system confirms with some level of confidence whether the target user is the individual represented by the presented authentication information and, based on that assessment, determines whether to grant the target user's request for access to the operational context. For clarity, the target user for whom motion data is collected is referred to as a requesting target user and the identity represented by the authentication credentials is referred to as an authenticating identity. Described differently, an authenticating identity is the identity being confirmed by the identify verification system 130. For example, if user John is attempting to gain access to an operational context using the authentication information of user Jeff, user John is designated as the requesting target user and user Jeff is designated as the authenticating identity. In this example, the identity verification system 130 would not authenticate requesting target user John and would not grant access to the operational context. As another example, if user John is attempting to gain access to an operational context using their own authentication information, John would be the identity of both the requesting target user and the authenticating identity. In such a situation, the identity verification system 130 would authenticate requesting target user John and grant access to the operational context.

Figure 2:
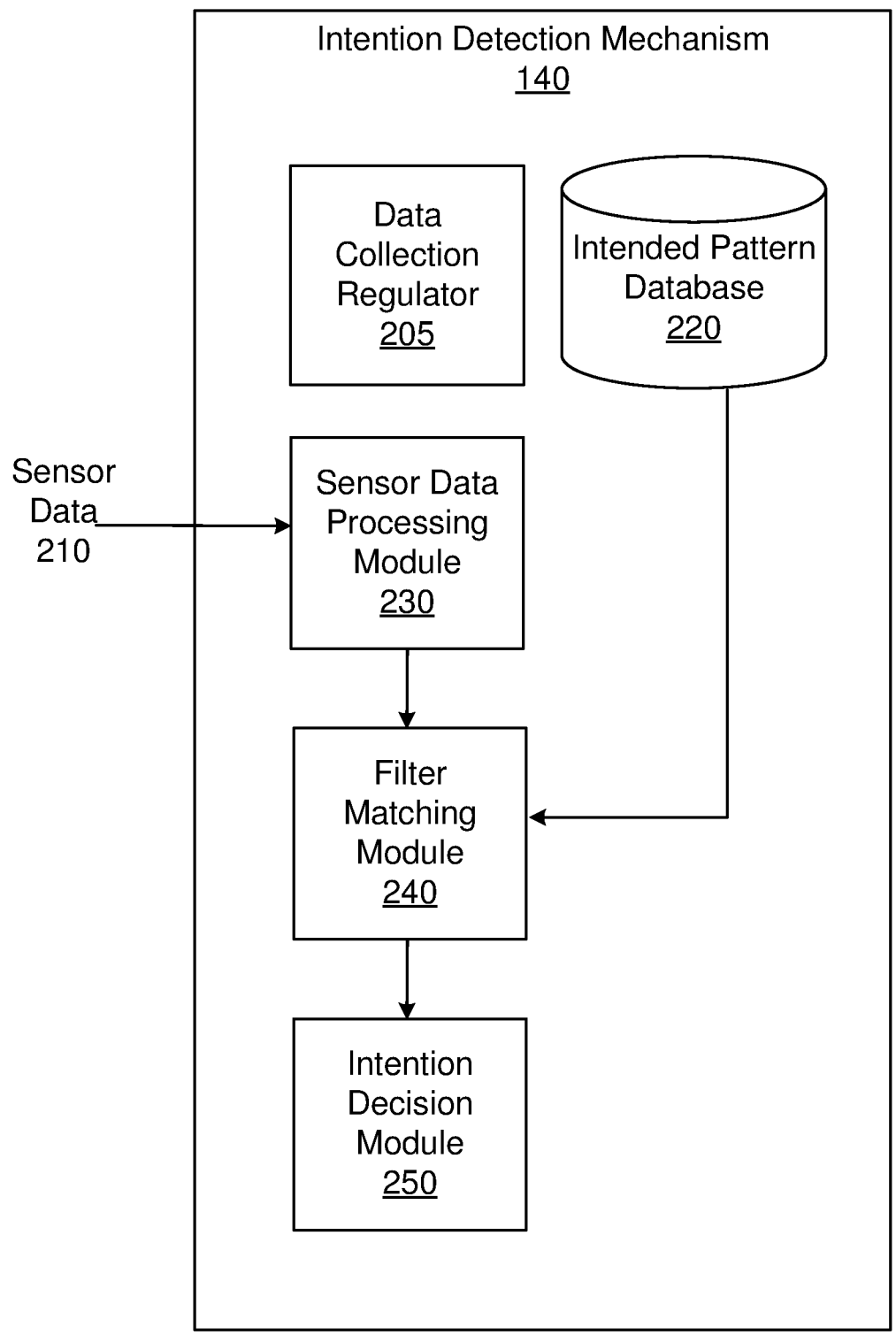
FIG. 2 is a block diagram of an example system architecture of the intention detection mechanism, according to one embodiment.

The identity detection mechanism, e.g., 140, processes data collected for the requesting target user to determine whether they intended to request access to the operational context. FIG. 2 is a block diagram of an example system architecture of the intention detection mechanism 140, according to one embodiment. The intention detection mechanism 140 may include a data collection regulator 205, an intended pattern database 220, a sensor data processing module 230, a filter matching module 240, and an intention decision module 250. In some embodiments, the intention detection mechanism 140 may include additional modules or components. In alternate embodiments, components of the intention detection mechanism described herein may be stored at a remote server (not shown) that is communicatively coupled to the intention detection mechanism 140 by a network.

Note that the reference to modules as used herein may be embodied and stored as program code (e.g., software instructions) and may be executable by a processor (or controller). The modules may be stored and executed using some or all of the components described in, for example, FIG. 6. Moreover, the modules also may be instantiated through other processing systems, for example, application specific integrated circuits (ASICs) and/or field programmable gate arrays (FPGAs), in addition to or in lieu of some or all of the components described with FIG. 6.

The data collection regulator 205 may be configured to determine that certain conditions for data collection have been satisfied at or around the operational context. Examples of such conditions include, but are not limited to, a proximity of a requesting target user to an operational context, a most recent entry into a secure operational context, or any other condition indicating that a target user may request access to an operational context in the near future. If the data collection regulator 205 confirms that at least on such condition has been met, the intention detection mechanism 140 will begin to collect sensor data 210, for example motion data for the target user. In some embodiments, the data collection regulator 205 may need to confirm that multiple such conditions have been met before the intention detection mechanism 140 begins to collect sensor data 310. If the data collection regulator 205 confirms no such condition or an insufficient combination of conditions has been met, the intention detection mechanism 140 will halt collection of sensor data 210.

The sensor data processing module 230 may be configured to receive sensor data 210 recorded by one or more data collecting sensors of the user identification system 100. Although techniques and systems are described herein with reference to motion data, it would be obvious to a person having ordinary skill in the art that those techniques and systems may also be applied to receive and process no-motion data. Accordingly, as described herein, sensor data 210 generally describes characteristic data collected by sensors of the user identification system 100. Sensor data 210 input to the sensor data processing module 230 may be detected based on, for example, a predefined activity or a pattern of activities recorded within a period of time. Returning the previous example where a target user knocks on a door, the predefined activity may be a number of knocks detected on a surface by an intention detection mechanism within a period of time, (e.g., 10 seconds), a pattern of knocks detected by the detection mechanism at a specified cadence or rhythm, or combination of knocks and other sensor data that demonstrates a target user's intent to access an operational context. For simplicity, embodiments and implementations of the intention detection mechanism 140 are described using knocks (e.g., a number of knocks or a pattern of knocks) as an example of the sensor data 210.

However, a person having ordinary skill in the art would recognize that sensor data 210 may be any alternate type of data input to the intention detection mechanism 140 or collected by a sensor 120. In an alternate embodiment, the intention detection mechanism 140 performs intention detection using audio signals captured from the microphone of a computing device 110.

Access to an operational context secured by an enterprise security system requires a combination of sensor data be collected for a requesting target user. The sensor data 210 used to authenticate the target user's access to each operational context may be stored in the intended pattern database 220. In some embodiments, sensor data 210 may be used to detect a request from a target user to both enter an operational context and to exit the operational context. For example, sensor data representing two knocks is interpreted as a request to lock a door and sensor data representing four knocks is interpreted as a request to unlock the door. Patterns of sensor data for entering and exiting an operational context may be stored in the intended pattern database 220. In another example, sensor data representing four knocks may open a garage door and sensor data representing an "S-O-S" like knocking pattern may lock a door.

Sensors implemented to record sensor data 210 encode signals that describe both characteristic data of a target user and the target user's intentions. Characteristics of the target user encoded in the signal data include, but are not limited to, a location of the target user or movements performed by the target user. Examples of movements performed by target user include, but are not limited to, activating a beacon or a trigger power on a device, walking towards an operational context, knocking on a locked door, or any other kind of movement that provides insight into a user's movement or intentions. Sensors implemented to record sensor data 210 may also measure physiological data describing characteristics of a target user, environmental data describing characteristics of a target user's surroundings), or both. Examples of sensors implemented to record sensor data 210 include, but are not limited to, accelerometers, gyroscopes, barometers, audio sensors (e.g., microphones), screen pressure sensors, BLUETOOTH sensors, Wi-Fi sensors, or any other sensor designed to collect data relevant to a computing device 110, the intention detection mechanism 140, or a requesting target user. In one embodiment, the sensor data processing module 230 generates a multi-channel time series based on sensor data captured from multiple sensors, where each channel of the time series characterizes data captured by a particular sensor.

By triggering and halting data collection based on the proximity of a target user (in space or time) to an operational context, the sensor data processing module 230 improves the energy efficiency of the user identification system 100 by preventing unnecessary energy consumption from being applied to extraneous data. For example, if a target user is a threshold distance away from the operational context or beyond a geofence around the operational context, the sensor data processing module 230 may deactivate sensors collecting motion data for the target user or reduce the frequency at which the sensors collect motion data for the target user. The sensor data processing module 230 may only begin to collect data from a requesting target user when the requesting target user is less than the threshold distance from the operational context or within the geofence around the operational context. For example, the sensor data processing module 230 may implement a threshold distance of 2 meters for an operational context representing a door to be unlocked. As another example, the sensor data processing module 230 triggers the collection of data 210 when a requesting target user is within a particular geography that overlaps within an operational context, a BLUETOOTH advertisement is available to the system, and other data (e.g., biometric data) confirms the identity of the requesting target user.

In some embodiments, the sensor data processing module 230 may apply a constraint filter to the sensor data 210 to determine whether the sensor data processing module 230 should subject signals encoded in the sensor data 210 to further processing. The sensor data processing module 230 may apply the constraint filter to identify and remove parts of the sensor data 210 (or time series of sensor data) that cannot be effectively analyzed to determine a requesting target user's intention, for example, sensor data collected by a mobile device sitting on a surface, lying flat horizontally, or moving in a car. A constraint filer assigned to an operational context may be a combination of threshold data conditions, which may also be stored in the intended pattern database 220. As described herein, a threshold data conditions describes a characteristic of a signal of the sensor data. For example, a threshold data condition may specify a strength of a signal or an amount of noise in a signal. If the collected sensor data 210 satisfies the threshold data conditions, the sensor data processing module 230 may not subject a signal encoded in the sensor data 201 to further signal refinement. If the collected sensor data 210 does not satisfy the threshold data conditions, the sensor data processing module 230 may subject the signal to further signal refinement, for example using additional signal processing filters or any other suitable signal processing technique.

In some example embodiments, the sensor data processing module 230 may identify a first subset of data 210 that satisfies the data thresholds in the constraint filter assigned to an operational context and a second subset of sensor data 210 that does not satisfy the data thresholds. The first subset of sensor data is passed to the filter matching module 240, but the second subset of sensor data may be subject to further processing by the sensor data processing module 230. The sensor data processing module 230 may continue to refine the second subset of sensor data until the second subset of sensor data also meets the data thresholds. The sensor data processing module 230 refines signals that do not satisfy the data thresholds by applying second level filtering techniques including, but not limited to, low-pass filters, high-pass filters, or band-pass filters to remove extraneous information such as direct current (DC) offsets and learned frequencies of noise that are characteristic of a device (e.g., intention detection mechanism 140 and/or the computing device 130) and/or the environment surrounding the device. The sensor data processing module 230 may further generate normalized versions of time series of the sensor data 210 such that the essential features of a signal can be readily extracted by other components of the intention detection mechanism 140. In another embodiment, the sensor data processing module 230 time warps the encoded signal.

The constraint filter may also define one or more physical thresholds assigned to the operational context. As described herein, physical thresholds characterize the type and nature of the sensor data 210. Returning to the earlier example involving door knocking, a physical threshold may specify a minimum number of knocks on the door, a total number of knocks, and/or a pattern of knocks on the door. Based on sensor data indicating that a computing device 110 is lying flat on a table, the sensor data processing module 230 may conclude that the physical threshold cannot be satisfied.

Alternatively, based on sensor data collected by an accelerometer describing a measure of force, the sensor data processing module 230 may conclude that the physical threshold is satisfied.

For an operational context, the filter matching module 240 accesses historical sensor data collected from target users who have previously entered the operational context, which is stored in the intended pattern database 220. As described herein, such historical data is also referred to as an "intentionality template." Accordingly, an intentionality template is sensor data collected from previous target users, known to have intentionally requested access to the operational context. In alternate embodiments, an intentionality template may be defined manually based on knock patterns or other characteristic data recorded for target users in the operational context or in a controlled testing environment. The intentionality template may be using any other suitable intentionality specification technique or any other data indicative of a user's intention.

Upon satisfying data thresholds specified by the constraint filter, the filter matching module 240 receives sensor data 210 and compares the sensor data 210 to the accessed intentionality template. To compare signals encoded in the signal data 210 with signals encoded in the intentionality template, the filter matching module 240 may apply a convolution operation, a set of filtering functions, or a combination thereof to generate a multi-channel time series representation of the sensor data 210, hereafter referred to as a "sensor data time series." Each channel of the sensor data time series describes a characteristic of the requesting target user. As described herein, each filtering function represents a time varying signal recorded by a sensor (e.g., sensor 160) when a user intentionally performs a series of movements. Accordingly, each filtering function represents a signal encoded from sensor data capturing a motion or part of a motion that a requesting target user may perform to request access to the operational context, for example knocking on a surface, and may be applied to remove noise from signals encoded in sensor data 210. Examples of filtering functions include, but are not limited to, high-pass filters, low-pass filters, band-pass filters, or any other suitable signal filtering technique.

In some embodiments, the intentionality template is also represented as a multi-channel time series, hereafter referred to as an "multi-channel intentionality template." Each channel of the multi-channel intentionality template may show a different pulse shape characteristic of a movement indicating intent to access an operational context. Returning to the earlier example involving knocks, each channel of the multi-channel intentionality template may have a pulse shape characteristic representative of a user intentionally knocking on a surface. Each channel may be selected based on actual sensor data collected at the time a computing device is first initialized for a target user, selected from a database of samples determined to be characteristic of a population of target users, designed from one or more theoretical considerations of the underlying physical processes for generate the type of signals characteristic of the indicative movements, or a combination thereof.

The filter matching module 240 applies a multi-channel filter to the sensor data time series (derived from the sensor data 210) and the multi-channel intentionality template to determine if the transformed time series contains a signal amplitude at the same location in time and within the same tolerance as a channel of the multi-channel filter. In some embodiments, the filter matching module 240 segments sensor data 210 into data captured by individual sensors and applies the matching analysis described above to sensor data collected by each sensor.

In one embodiment, the filter matching module 240 applies a time-variant linear filter (y) to the sensor data 210 (x). The output of the linear filter (y) is a convolution of x with the fixed filter vector h. The filter vector h contains the filter coefficients h(0), h(1) . . . . As described herein, the filters are digital and, therefore, components of the linear filter occur are at discrete time steps t=nT, where T represents the sampling period. In one embodiment, the sampling period T is equivalent to 1. Accordingly, the inputs x(n) and outputs y(n) occur at all times t∈ ℤ. The convolution operation may be characterized as the product of the linear filter with the time reversed source signals according to Equation (1):

$$y[n] = \sum_{k=0}^{M} h[k]x[n-k] \quad (1)$$

where M represents the extent of the filter. Time reversal, denoted as $\mathcal{T}$ acts on a time varying signal x(t), such that $$\mathcal{T}[x(t)] = x(n-t),$$

where n denotes a time value for which $$x(t) = 0, \forall\, t \geq n.$$

Accordingly, the filter matching module 240 applies a linear filter for maximizing the signal to noise ratio in the presence of additive stochastic noise by correlating a known delayed, template signal (e.g., the multi-channel intentionality template discussed above) with a source signal (the sensor data time series discussed above) to detect the presence of the multi-channel intentionality template within the sensor data time series. The correlating operation implemented by the matching filter module 240 (as discussed above) may be determined by performing the convolution of the source signal with a time reversed version of the template signal. The linear filter applied by the filter matching module 240 may be designed to correlate with the location of the template signal in the source signal. By searching for high amplitude peaks within the output signal of the filter, the filter matching module identify the template signal within the source signal. Thus, the filter matching module 240 determines whether the multi-channel intentionality template is present within the sensor data time series. As described herein, filters implemented by the filter matching module 240 are selected to exhibit high correlation with signal characteristics of sensor data collected from target user requesting access to an operational context or who have historically requested access to the operational context.

In some example embodiments, the filter matching module 240 may apply a combination of several filters in series or in parallel to a sensor data time series to determine the presence of a multi-channel intentionality template within a sensor data time series. Based on the signal comparison analysis performed by the filter matching module 240, the intention decision module 250, determines if the channels of sensor data 210 contain the intentionality template (or if the channels of the sensor data time series contain the multi-channel intentionality template). That is, the channels of sensor data 210 include the intentionality template.

In terms of the requesting target user, the intention decision module 250 determines based on the output of the filter matching module 240 if the requesting target user intended to access the operational context (e.g., the requesting target intended perform the indicative movement and the location of the operational context). If the intentionality template is present in the sensor data 210, the intention decision module 250 communicates a signal to the identity verification system 130 that confirms the intent of the requesting target user based on the presence of the intentionality template. The communicated signal additionally includes a request (or instructions) for the identity verification system 130 to authenticate the requesting target user before granting their access to the operational context.

If the intentionality template is not present in the sensor data 210, the intention decision module 250 communicates a signal to the identity verification system 130. The signal may indicate that the target user did not intend to request access to the operational context with a request to neither authenticate the requesting target user nor grant the requesting target user access to the operational context. As described herein, when the intentionality template is not present in the sensor data 210, the intention decision module 250 communicate a signal for the identity verification system 130 to ignore the target user's attempted access by denying the requesting target user access to the operational context without authenticating or verifying their identity. The filter matching module 240 is further described below with reference to FIG. 4.

The identity verification system 130 may grant the requesting target user access to an operational context in a number of ways, for example by automatically opening a locked door in the operational context, unlocking an electronic safe in operational context, presenting a secured asset to the requesting target user, or allowing the requesting target user access to a secure digital server or secured data on a digital server.

Figure 3:
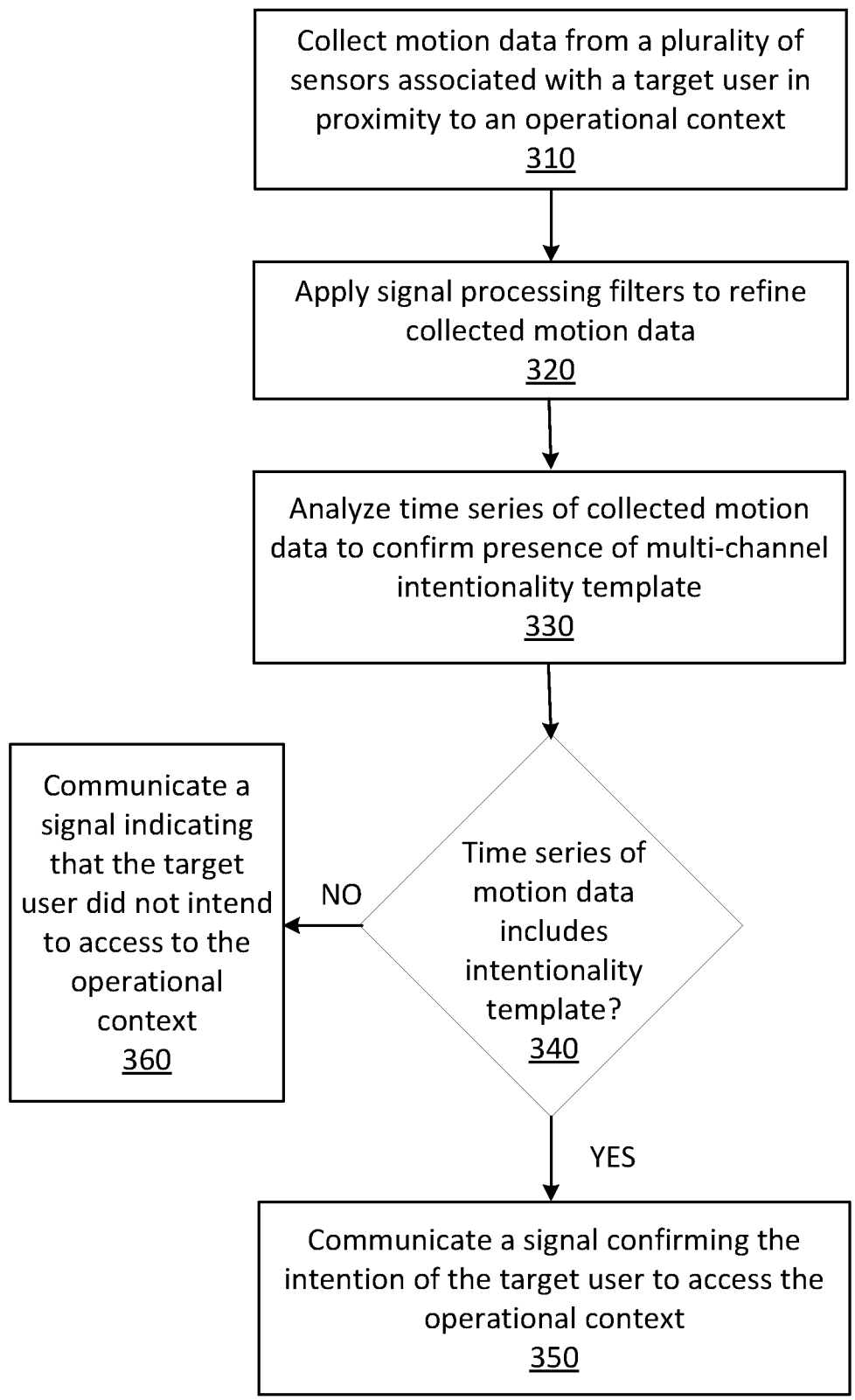
FIG. 3 is a flowchart illustrating an example process for confirming a target user's intent to access an operational context, according to one embodiment.

FIG. 3 is a flowchart illustrating an example process for confirming a target user's intent to access an operational context, according to one embodiment. Note that the reference to process includes the actions described in the process or method. Further, the steps of the process also may be embodied as program code (e.g., software instructions) and may be executable by a processor (or controller) to carry out the process when executed. The program code may be stored and executed using some or all of the components described in, for example, FIG. 6. Moreover, the program code also may be instantiated through other processing systems, for example, application specific integrated circuits (ASICs) and/or field programmable gate arrays (FPGAs), in addition to or in lieu of some or all of the components described with FIG. 6.

The intention detection mechanism 140 collects 310 motion data from a plurality of sensors associated with a target user in proximity to an operational context. The collected motion data may characterize the target user's location relative to the operational context (e.g., an entrance into to a room or building of an enterprise facility) and movements at that location. As described above, the collected motion data may also be any alternate form of suitable sensor data (e.g., characteristic data in general) and may be more generally referred to as "sensor data." Although described with reference to motion data, a person having ordinary skill in the art would recognize that the systems and techniques described herein may be applied to alternate types or forms of characteristic data. Based on an evaluation of a time series of the collected motion data, the intention detection mechanism 140 applies 320 signal processing filters to refine the collected motion data as needed, for example by applying high-pass, low-pass, and band-pass filters to remove noise from the time series signal of the collected motion data.

The intention detection mechanism 140 analyzes 330 the time series of the motion data by comparing the time series of the motion data, hereafter referred to as the motion data time series, to a multi-channel intentionality template. As discussed above, the multi-channel intentionality template is determined based on a set of motion data known to confirm a target user's intent to access the operational context. As described above with reference to FIG. 2, the intention detection mechanism 140 analyzes the motion data time series to confirm the presence of the multi-channel intentionality template within motion data time series. Depending on whether the multi-channel intentionality template is present in the motion data time series, the intention detection mechanism 140 makes an assessment regarding whether the target user intent to access to the operational context. If the multi-channel intentionality template is confirmed to be within the motion data time series, the intention detection mechanism 140 communicates 350 a signal (e.g., to the resource owner 150) confirming the intention of the target user to access the operational context. If the multi-channel intentionality template is not within the motion data time series, the intention detection mechanism 140 communicates a signal (e.g., to the resource owner 150) indicating that the target user did not intend to access the operational context.

Figure 4:
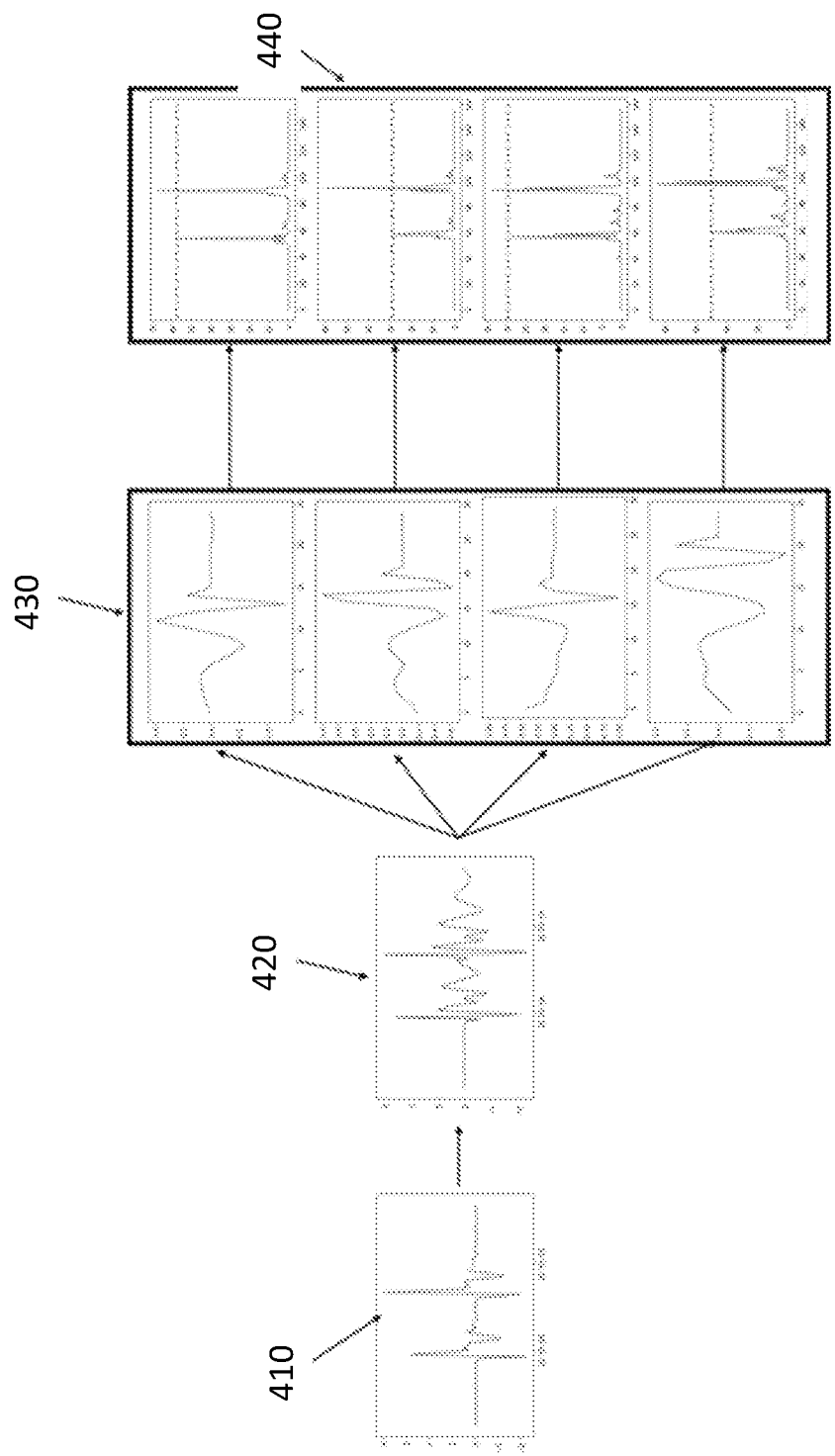
FIG. 4 illustrates an example process for comparing a sensor data time series to a multi-channel intentionality template, according to one embodiment.

FIG. 4 illustrates an example process for comparing a sensor data time series to a multi-channel intentionality template, according to one embodiment. Intention detection mechanism 140 collects sensor data, which is encoded as a time varying accelerometer signal 410, when a target user knocks on a device (e.g., a door retrofitted with an accelerometer sensor, or a mobile device with an embedded accelerometer). The intention detection mechanism 140 subjects the accelerometer signal 410 to a high pass filter to remove low frequency background noise, resulting in the refined signal 420. The intention detection mechanism 140 accesses a multi-channel intentionality template describing a combination of motion data that would confirm the target user's intent to access the operational context behind the door. As illustrated, the accessed multi-channel intentionality template 430 is a four channel time series to be matched against the time series of the sensor data 420. Each channel of the time series 430 represents a different pulse shape characteristic for a user intentionally knocking on the device. The comparison of each channel of the multi-channel intentionality template to the time series of the sensor data 420 results in the matched time series 440. Each channel of the matched time series 440 correlates with a channel of the sensor data 210 (e.g., the source signal) processed using a high pass filter.

Figure 5:
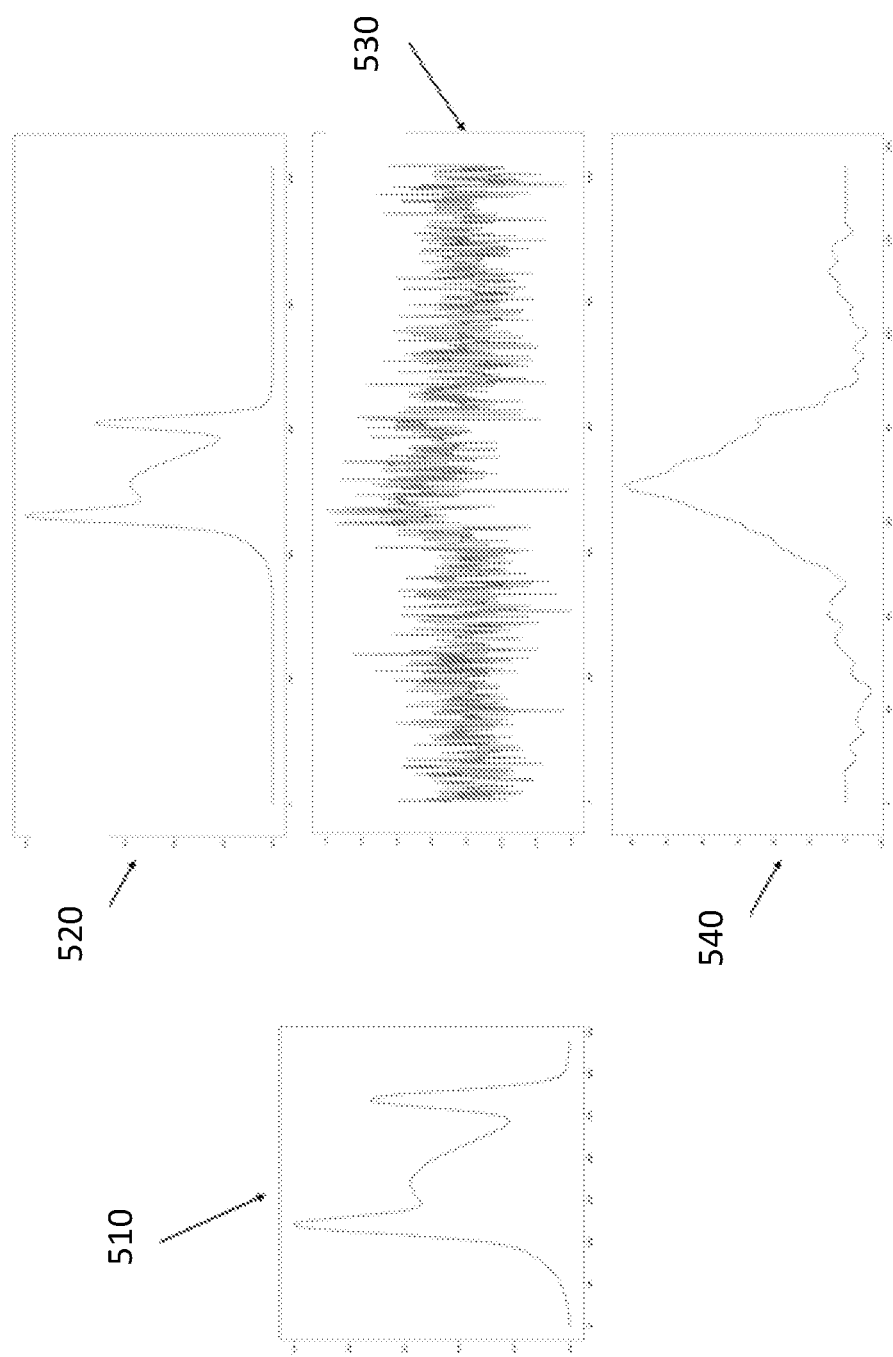
FIG. 5 illustrates an example process where a multi-channel intentionality template is correlated with a noisy motion data time series, according to one embodiment.

FIG. 5 illustrates an example process where a multi-channel intentionality template is correlated with a sensor data time series including noise signals, according to one embodiment. The multi-channel intentionality template 510 is correlated with a sensor data time series 530 with a significant amount of noise. The time series 530 is collected by one or more sensors that have a significant amount of noise. The resulting output 540 of the convolution operation applied by the filter matching module 240 includes an above threshold amplitude in the region where the multi-channel intentionality template is present in 530. The peak identified in the output 540 correlates with the location of the multi-channel intentionality template in the sensor data time series determined from the signal 520.

Computing Machine Architecture

Figure 6:
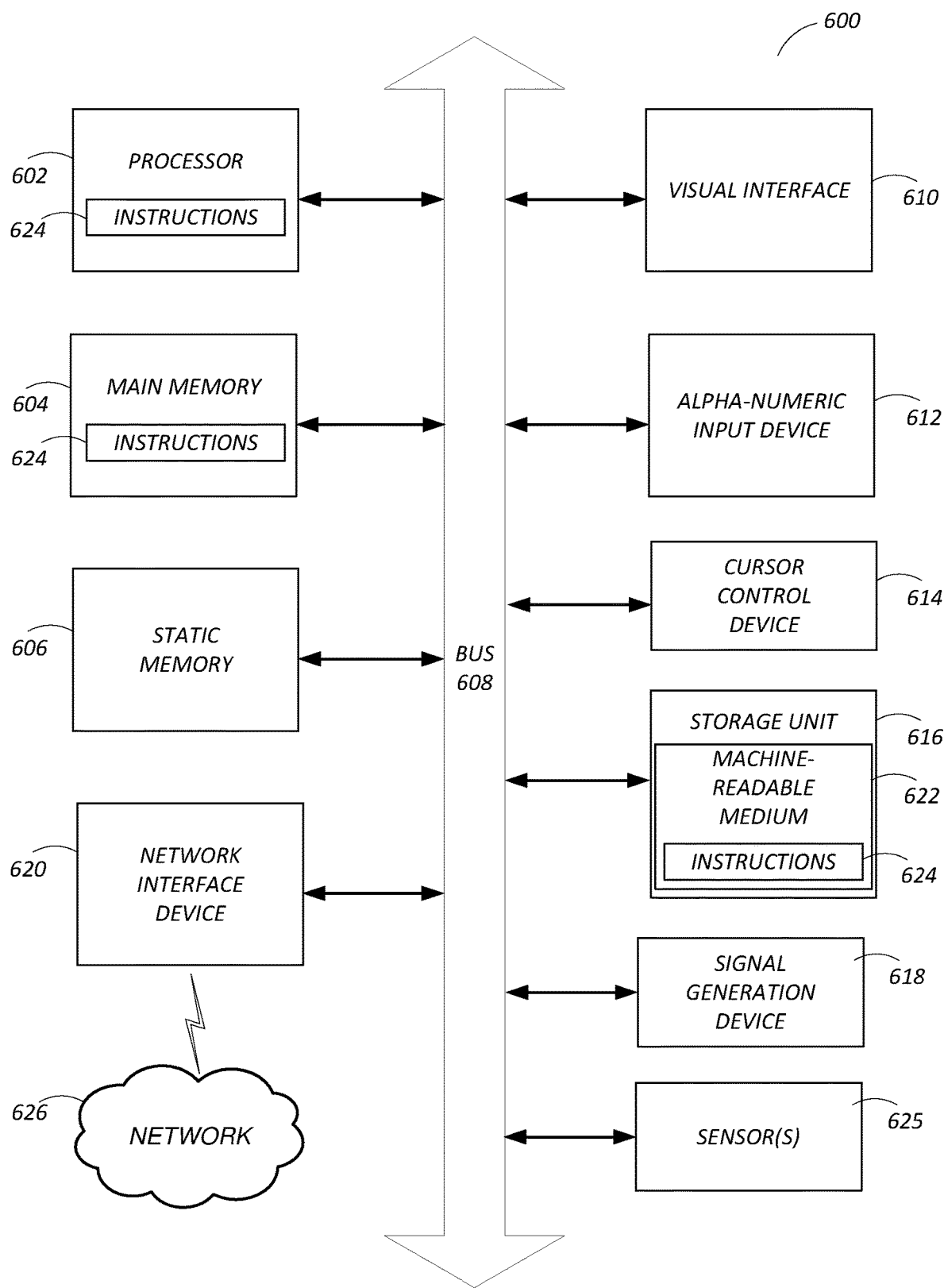
FIG. 6 is a block diagram illustrating components of an example machine able to read instructions from a machine-readable medium and execute them in a processor (or controller), according to one embodiment.

FIG. 6 is a block diagram illustrating components of an example machine able to read instructions from a machine-readable medium and execute them in a processor (or controller). FIG. 6 is an example of a processing system, of which a some of the described components or all of the described components may be leveraged by the modules described herein for execution.

In this example, FIG. 6 shows a diagrammatic representation of a machine in the example form of a computer system 600 within which program code (e.g., software) for causing the machine to perform any one or more of the processes or (methodologies) discussed herein (e.g., with respect to FIGS. 1-5) may be executed. The program code may be comprise instructions 625 executable by the processor 602. In the intention detection mechanism 140, the instructions may correspond to the functional components described in FIG. 2 and the steps illustrated in FIGS. 3-5.

In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment. It is noted that some or all of the components described may be used in a machine to execute instructions, for example, those corresponding to the processes described with the disclosed configurations.

The machine may be, for example, a server computer, a client computer, or a personal computer (PC) for systems performing, for example as a centralized processing system. The machine also may be a tablet PC, a personal digital assistant (PDA), a cellular telephone, a smartphone, or a wearable device, for systems performing, for example, data collection and local processing. In each instance, the configured machine may be capable of executing instructions 624 (sequential or otherwise) that specify actions to be taken by that machine. Further, while only a single machine is illustrated, the term "machine" shall also be taken to include any collection of machines that individually or jointly execute instructions 624 to perform any one or more of the methodologies discussed herein.

The example computer system 600 includes a processor 602 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 604, and a static memory 606, which are configured to communicate with each other via a bus 608. The computer system 600 may further include visual display interface 610. The visual interface may include a software driver that enables displaying user interfaces on a screen (or display). The visual interface may display user interfaces directly (e.g., on the screen) or indirectly on a surface, window, or the like (e.g., via a visual projection unit). For ease of discussion the visual interface may be described as a screen. The visual interface 610 may include or may interface with a touch enabled screen. The computer system 600 may also include alpha-numeric input device 66 (e.g., a keyboard or touch screen keyboard), a cursor control device 614 (e.g., a mouse, a trackball, a joystick, a motion sensor, or other pointing instrument), a storage unit 616, a signal generation device 618 (e.g., a speaker), and a network interface device 620, which also are configured to communicate via the bus 608. It is noted that the example computer system 1100 need not include all the components but may include a subset.

The storage unit 616 includes a machine-readable medium 622 on which is stored instructions 624 (e.g., software) embodying any one or more of the methodologies or functions described herein. The instructions 624 (e.g., software) may also reside, completely or at least partially, within the main memory 604 or within the processor 602 (e.g., within a processor's cache memory) during execution thereof by the computer system 600, the main memory 604 and the processor 602 also constituting machine-readable media. The instructions 624 (e.g., software) may be transmitted or received over a network 626 via the network interface device 620.

While machine-readable medium 622 is shown in an example embodiment to be a single medium, the term "machine-readable medium" should be taken to include a single medium or multiple media (e.g., a centralized or distributed database, or associated caches and servers) able to store instructions (e.g., instructions 624). The term "machine-readable medium" shall also be taken to include any medium that is capable of storing instructions (e.g., instructions 624) for execution by the machine and that cause the machine to perform any one or more of the methodologies disclosed herein. The term "machine-readable medium" includes, but not be limited to, data repositories in the form of solid-state memories, optical media, and magnetic media.

Additional Considerations

The disclosed identity verification system 130 enables enterprise systems to track and evaluate a user's access to an operational context in real-time. Compared to conventional systems which determine a user's access at a single point in time, the described identity verification system continuously verifies a user's identity based on motion data recorded by a mobile device or a combination of other sources. Because characteristics of a user's movement and activities are unique to individual users, the identity verification system 130 is able to accurately verify a user's identity with varying levels of confidence. Additionally, by leveraging motion data recorded for a user, the identity verification system 130 may not be spoofed or hacked by someone attempting to access the operational context under the guise of another user's identity. Moreover, by continuously comparing a confidence identity value for a user to a threshold specific to an operational context, the enterprise system may revoke or maintain a user's access.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for confirming an identity of a particular user based on motion data received from various sources through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A non-transitory computer-readable medium comprising stored computer-readable instructions that, when executed by a processor, cause the processor to:
   access sensor data collected by a plurality of sensors in response to detecting that a target user is accessing an operational context, the accessed sensor data encoding signals describing one or more characteristics of the target user and surroundings of the target user;
   input the accessed sensor data to one or more signal processing filters to generate a sensor data time series, wherein the sensor data time series is a multi-channel representation of the accessed sensor data and each channel of the sensor data time series represents a characteristic of the one or more characteristics of the target user;
   access a multi-channel intentionality template for the operational context, wherein the multi-channel intentionality template describes characteristics indicative of an intent of a target user to access to the operational context;
   compare the sensor data time series to the multi-channel intentionality template using a multi-channel filter, wherein the multi-channel filter determines whether the sensor data time series contains the multi-channel intentionality template; and
   communicate, to a computing device at the operational context, a signal confirming that the target user intended to access the operational context in response to determining that the sensor data time series contains the multi-channel intentionality template, wherein the signal comprises instructions to authenticate an identity of the target user before granting access to the operational context to the target user.

2. The non-transitory computer-readable medium of claim 1, wherein the instructions to access sensor data collected by the plurality of sensors further comprises instructions that when executed cause the processor to:
   determine whether a condition for data collection has been satisfied at or around the operational context; and
   access sensor data collected by the plurality of sensors in response to determining that the condition for data collection has been satisfied.

3. The non-transitory computer-readable medium of claim 1, comprising further instructions that when executed cause the processor to:
   input the accessed sensor data to a constraint filter comprising a threshold data condition to identify a first subset of signals in the accessed sensor data that satisfy the threshold data condition and a second subset of signals the accessed sensor data that does not satisfy the threshold data condition;
   input signals in the first subset to the one or more signal processing filters to encode the sensor data time series; and
   apply one or more second level filtering techniques to refine signals in the second subset until each signal in the second subset satisfies the threshold data condition.

4. The non-transitory computer-readable medium of claim 1, wherein the one or more signal processing filters for generating a sensor data time series is a convolution operation comprising a set of filtering functions, wherein each filtering function represents a time varying signal that can be applied to remove noise from the encoded signals of the accessed sensor data, the time varying signal recorded by a sensor when a user intentionally performs a set of movements.

5. The non-transitory computer-readable medium of claim 1, wherein the instructions to compare the sensor data time series to the multi-channel intentionality template further comprises instructions that when executed cause the processor to:
   identify a signal amplitude that appears in both the sensor data time series and the multi-channel intentionality template at a common location in time and within a tolerance of a channel of the multi-channel filter;
   determines that the sensor data time series contains the multi-channel intentionality template in response to identifying the signal amplitude; and communicate a signal confirming that the sensor data time series contains the multi-channel intentionality template.

6. The non-transitory computer-readable medium of claim 1, wherein the instructions to compare the sensor data time series to the multi-channel intentionality template further comprises instructions that when executed cause the processor to:
input the multi-channel intentionality template and the sensor data time to a linear filter, wherein the linear filter correlates the multi-channel intentionality template with the sensor data time series to maximize a signal to noise ratio between both time series; and
determine that the sensor data time series contains the multi-channel intentionality template based on a correlation of the multi-channel intentionality template and the sensor data time series.

7. The non-transitory computer-readable medium of claim 1, comprising further instructions that when executed cause the processor to:
determine that the sensor data time series does not contain the multi-channel intentionality template; and
communicate, to the computing device, a signal with instructions to deny the target user access to the operational context without authenticating the identity of the target user.

8. A system comprising:
a plurality of sensors configured to collect sensor data, wherein the collected sensor data encodes signals describing one or more characteristics of a target user and an environment of the target user;
a computing device located at an operational context, the computing device configured to process a request from the target user for access to the operational context; and
a non-transitory computer-readable medium comprising stored computer-readable instructions that, when executed by a processor, cause the processor to:
access sensor data encoding signals describing one or more characteristics of the target user and surroundings of the target user in response to detecting that the target user is accessing the operational context;
input the accessed sensor data to one or more signal processing filters to generate a sensor data time series, wherein the sensor data time series is a multi-channel representation of the accessed sensor data and each channel of the sensor data time series represents a characteristic of the one or more characteristics of the target user;
access a multi-channel intentionality template for the operational context, wherein the multi-channel intentionality template describes characteristics indicative of an intent of a target user to access the operational context;
compare the sensor data time series to the multi-channel intentionality template using a multi-channel filter, wherein the multi-channel filter determines whether the sensor data time series contains the multi-channel intentionality template; and
communicate, to the computing device, a signal confirming that the target user intended to access the operational context in response to determining that the sensor data time series contains the multi-channel intentionality template, wherein the signal comprises instructions to authenticate an identity of the target user before granting access to the operational context to the target user.

9. The system of claim 8, wherein the instructions to access sensor data collected by the plurality of sensors further comprises instructions that when executed cause the processor to:
determine whether a condition for data collection has been satisfied at or around the operational context; and
access sensor data collected by the plurality of sensors in response to determining that the condition for data collection has been satisfied.

10. The system of claim 8, comprising further instructions that when executed cause the processor to:
input the accessed sensor data to a constraint filter comprising a threshold data condition to identify a first subset of signals in the accessed sensor data that satisfy the threshold data condition and a second subset of signals the accessed sensor data that does not satisfy the threshold data condition;
input signals in the first subset to the one or more signal processing filters to encode the sensor data time series; and
apply one or more second level filtering techniques to refine signals in the second subset until each signal in the second subset satisfies the threshold data condition.

11. The system of claim 8, wherein the one or more signal processing filters for generating a sensor data time series is a convolution operation comprising a set of filtering functions, wherein each filtering function represents a time varying signal that can be applied to remove noise from the encoded signals of the accessed sensor data, the time varying signal recorded by a sensor when a user intentionally performs a set of movements.

12. The system of claim 8, wherein the instructions to compare the sensor data time series to the multi-channel intentionality template further comprises instructions that when executed cause the processor to:
identify a signal amplitude that appears in both the sensor data time series and the multi-channel intentionality template at a common location in time and within a tolerance of a channel of the multi-channel filter;
determines that the sensor data time series contains the multi-channel intentionality template in response to identifying the signal amplitude; and
communicate a signal confirming that the sensor data time series contains the multi-channel intentionality template.

13. The system of claim 8, wherein the instructions to compare the sensor data time series to the multi-channel intentionality template further comprises instructions that when executed cause the processor to:
input the multi-channel intentionality template and the sensor data time to a linear filter, wherein the linear filter correlates the multi-channel intentionality template with the sensor data time series to maximize a signal to noise ratio between both time series; and
determine that the sensor data time series contains the multi-channel intentionality template based on a correlation of the multi-channel intentionality template and the sensor data time series.

14. The system of claim 8, comprising further instructions that when executed cause the processor to:
determine that the sensor data time series does not contain the multi-channel intentionality template; and
communicate, to the computing device, a signal with instructions to deny the target user access to the operational context without authenticating the identity of the target user.

15. A system comprising:
a plurality of sensors configured to collect sensor data, wherein the collected sensor data encodes signals describing one or more characteristics of a target user and an environment of the target user;
a computing device located at an operational context, the computing device configured to process a request from the target user for access to the operational context;
a sensor data processing module configured to:
   access sensor data collected by a plurality of sensors in response to detecting that the target user is accessing the operational context, the sensor data encoding signals describing one or more characteristics of the target user and surroundings of the target user; and
   input the accessed sensor data to one or more signal processing filters to generate a sensor data time series, wherein the sensor data time series is a multi-channel representation of the accessed sensor data and each channel of the sensor data time series represents a characteristic of the one or more characteristics of the target user;
a filter matching module configured to:
   access a multi-channel intentionality template for the operational context, wherein the multi-channel intentionality template describes characteristics indicative of an intent of a target user to access the operational context; and
   compare the sensor data time series to the multi-channel intentionality template using a multi-channel filter, wherein the multi-channel filter determines whether the sensor data time series contains the multi-channel intentionality template; and
an intention decision module configured to:
   communicate a signal confirming that the target user intended to access the operational context in response to determining that the sensor data time series contains the multi-channel intentionality template, wherein the signal comprises instructions to authenticate an identity of the target user before granting access to the operational context to the target user.

16. The system of claim 15, wherein the sensor data processing module is further configured to:
   input the accessed sensor data to a constraint filter comprising a threshold data condition to identify a first subset of signals in the accessed sensor data that satisfies the threshold data condition and a second subset of signals the accessed sensor data that does not satisfy the threshold data condition;
   input signals in the first subset to the one or more signal processing filters to encode the sensor data time series; and
   apply one or more second level filtering techniques to refine signals in the second subset until each signal in the second subset satisfies the threshold data condition.

17. The system of claim 15, wherein the one or more signal processing filters for generating a sensor data time series is a convolution operation comprising a set of filtering functions, wherein each filtering function represents a time varying signal that can be applied to remove noise from the encoded signals of the accessed sensor data, the time varying signal recorded by a sensor when a user intentionally performs a set of movements.

18. The system of claim 15, wherein the filter matching module is further configured to:
   identify a signal amplitude that appears in both the sensor data time series and the multi-channel intentionality template at a common location in time and within a tolerance of a channel of the multi-channel filter;
   determines that the sensor data time series contains the multi-channel intentionality template in response to identifying the signal amplitude; and
   communicate a signal confirming that the sensor data time series contains the multi-channel intentionality template.

19. The system of claim 15, wherein the filter matching module is further configured to:
   input the multi-channel intentionality template and the sensor data time to a linear filter, wherein the linear filter correlates the multi-channel intentionality template with the sensor data time series to maximize a signal to noise ratio between both time series; and
   determine that the sensor data time series contains the multi-channel intentionality template based on a correlation of the multi-channel intentionality template and the sensor data time series.

20. The system of claim 15, wherein the intention decision module is further configured to:
   determine that the sensor data time series does not contain the multi-channel intentionality template; and
   communicate, to the computing device, a signal with instructions to deny the target user access to the operational context without authenticating the identity of the target user.

* * * * *